(12) United States Patent
Barnidge et al.

(10) Patent No.: US 8,411,235 B1
(45) Date of Patent: Apr. 2, 2013

(54) DISPLAYS FOR THREE-DIMENSIONAL IMAGING

(75) Inventors: Tracy J. Barnidge, Marion, IA (US);
Paul R. Nemeth, Springville, IA (US);
Alyssa A. Butterfield, Marion, IA (US);
James D. Sampica, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 447 days.

(21) Appl. No.: 12/725,256

(22) Filed: Mar. 16, 2010

(51) Int. Cl.
*G02F 1/1335* (2006.01)

(52) U.S. Cl. ........................................ 349/112

(58) Field of Classification Search .................. 349/112
See application file for complete search history.

(56) References Cited

U.S. PATENT DOCUMENTS

| | | | |
|---|---|---|---|
| 4,043,638 A | 8/1977 | Kaufmann | |
| 4,387,133 A | 6/1983 | Ichikawa et al. | |
| 4,637,850 A | 1/1987 | Suzuki et al. | |
| 4,715,686 A | 12/1987 | Iwashita et al. | |
| 4,717,949 A | 1/1988 | Eichenlaub | |
| 5,106,441 A | 4/1992 | Brosig et al. | |
| 5,150,231 A | 9/1992 | Iwamoto et al. | |
| 5,208,080 A | 5/1993 | Gajewski et al. | |
| 5,217,811 A | 6/1993 | Filas et al. | |
| 5,243,453 A | 9/1993 | Kawaguchi et al. | |
| 5,275,680 A | 1/1994 | Sirkin et al. | |
| 5,329,391 A | 7/1994 | Miyamoto et al. | |
| 5,365,356 A | 11/1994 | McFadden | |
| 5,371,619 A | 12/1994 | Sirkin et al. | |
| 5,566,840 A | 10/1996 | Waldner et al. | |
| 5,592,288 A | 1/1997 | Sampica et al. | |
| 5,742,372 A | 4/1998 | Furukawa | |
| 5,867,241 A | 2/1999 | Sampica et al. | |
| 6,181,303 B1 | 1/2001 | Johnson et al. | |
| 6,204,967 B1 | 3/2001 | Morishima et al. | |
| 6,211,938 B1 | 4/2001 | Mori | |
| 6,388,724 B1 | 5/2002 | Campbell et al. | |
| 6,590,605 B1 | 7/2003 | Eichenlaub | |
| 6,614,057 B2 | 9/2003 | Silvernail et al. | |
| 6,784,612 B2 | 8/2004 | Park et al. | |
| 6,803,245 B2 | 10/2004 | Auch et al. | |
| 6,984,545 B2 | 1/2006 | Grigg et al. | |
| 6,998,648 B2 | 2/2006 | Silvernail | |
| 7,097,527 B2 | 8/2006 | Matsuoka | |
| 7,265,909 B2 * | 9/2007 | Matsui | 359/620 |

(Continued)

FOREIGN PATENT DOCUMENTS

| | | |
|---|---|---|
| EP | 0 556 351 B1 | 6/1995 |
| EP | 0 711 103 B1 | 3/2000 |

(Continued)

OTHER PUBLICATIONS

U.S. Appl. No. 12/012,722, filed Feb. 5, 2008, Nemeth et al.

(Continued)

*Primary Examiner* — Phu Vu
(74) *Attorney, Agent, or Firm* — Donna P. Suchy; Daniel M. Barbieri (57) ABSTRACT

A display for presenting a stereoscopic image includes multiple layers of image forming devices configured to provide the stereoscopic image and an etched substrate configured to diffuse light projected through or from the multiple layers of image forming devices. The etched substrate is laminated or bonded to a front surface of the multiple layers of image forming devices.

25 Claims, 6 Drawing Sheets

U.S. PATENT DOCUMENTS

| | | | |
|---|---|---|---|
| 7,273,403 | B2 | 9/2007 | Yokota et al. |
| 7,381,110 | B1 | 6/2008 | Sampica et al. |
| 7,435,311 | B1 | 10/2008 | Marzen et al. |
| 7,452,258 | B1 | 11/2008 | Marzen et al. |
| 7,566,254 | B2 | 7/2009 | Sampica et al. |
| 7,889,284 | B1 * | 2/2011 | Nemeth et al. .................. 349/12 |
| 2003/0017777 | A1 | 1/2003 | Matsuoka et al. |
| 2004/0225025 | A1 | 11/2004 | Sullivan et al. |
| 2005/0126679 | A1 | 6/2005 | Kim |
| 2006/0245171 | A1 | 11/2006 | Kim et al. |
| 2008/0186575 | A1 * | 8/2008 | Kim et al. ..................... 359/463 |
| 2008/0312670 | A1 | 12/2008 | Lutze et al. |
| 2009/0120572 | A1 | 5/2009 | Sampica et al. |
| 2009/0120585 | A1 | 5/2009 | Sampica et al. |
| 2009/0126872 | A1 | 5/2009 | Sampica et al. |
| 2009/0183381 | A1 | 7/2009 | Sampica et al. |
| 2009/0183615 | A1 | 7/2009 | Sampica et al. |
| 2009/0186218 | A1 | 7/2009 | Sampica et al. |

FOREIGN PATENT DOCUMENTS

| | | |
|---|---|---|
| JP | 1-210328 A | 8/1989 |
| JP | 5-200880 A | 8/1993 |
| JP | 5-293895 A | 11/1993 |
| JP | 5-324203 | 12/1993 |
| JP | 6-051484 A | 2/1994 |
| JP | 9-057779 A | 3/1997 |
| JP | 10-156853 A | 6/1998 |
| JP | 10-244589 A | 9/1998 |
| JP | 11-53114 | 2/1999 |
| JP | 2000-141388 A | 5/2000 |
| JP | 2001-005401 A | 1/2001 |
| JP | 2002-137352 A | 5/2002 |
| JP | 2004-233590 A | 8/2004 |
| JP | 2006-218658 A | 8/2006 |
| JP | 2006-222267 A | 8/2006 |
| JP | 2006-334912 A | 12/2006 |
| JP | 2007-206559 A | 8/2007 |
| JP | 2008-238607 A | 10/2008 |
| KR | 10199929922 | 4/1999 |
| KR | 10200716614 | 2/2007 |
| WO | WO 93/05634 A1 | 3/1993 |
| WO | WO 2009/091923 A2 | 7/2009 |

OTHER PUBLICATIONS

U.S. Appl. No. 12/286,006, filed Sep. 26, 2008, Barnidge et al.
U.S. Appl. No. 12/485,744, filed Jun. 16, 2009, Nemeth et al.
U.S. Appl. No. 12/611,016, filed Nov. 2, 2009, Nemeth et al.
International Search Report and Written Opinion for International Application No. PCT/US2009/031151, mailed Aug. 28, 2009, 7 pages.
Kirsch et al., Improvements in the Dual LCD-Based Stereo Display, Proceedings of SPIE, vol. 5801, 2005, 15 pages.
Polaris Sensor Technologies, Inc., Flat Panel 3D Display Specification Sheet, 1 page, Apr. 2010.
Walker, GD-Itronix Dynavue Technology: The Ultimate Outdoor-Readable Touch-Screen Display, Rugged PC Review, 4 pages, Jun. 4, 2007.

* cited by examiner

DISPLAYS FOR THREE-DIMENSIONAL IMAGING

CROSS-REFERENCE TO RELATED PATENT APPLICATIONS

This application is related to co-pending U.S. Ser. No. 12/611,016, filed Nov. 2, 2009, co-pending U.S. Ser. No. 12/485,744, filed Jun. 16, 2009, co-pending U.S. Ser. No. 12/009,375, filed Jan. 18, 2008, co-pending U.S. Ser. No. 12/009,482, filed Jan. 18, 2008, co-pending U.S. Ser. No. 12/009,472, filed Jan. 18, 2009, co-pending U.S. Ser. No. 12/009,393, filed Jan. 18, 2008, co-pending U.S. Ser. No. 12/009,373, filed Jan. 18, 2008, co-pending U.S. Ser. No. 12/009,372, filed Jan. 18, 2008, and co-pending P.C.T. Application No. PCT/US2009/031151, filed Jan. 15, 2009, each of which is herein incorporated by reference in its entirety. This application is also related to U.S. Pat. No. 5,592,288, filed Apr. 28, 1995, U.S. Pat. No. 5,867,241, filed Apr. 28, 1995, and U.S. Pat. No. 6,388,724, filed May 2, 2000, U.S. Pat. No. 7,452,258, filed Aug. 30, 2005, and U.S. Pat. No. 7,566,254, filed Aug. 30, 2005, each of which is herein incorporated by reference in its entirety.

BACKGROUND

The present disclosure relates generally to the field of three-dimensional imaging. The present invention more particularly relates to the field of stereoscopic and autostereoscopic displays.

Stereoscopic imaging is a technique for creating a three-dimensional scene or the illusion of depth by presenting a different image to each eye. An autostereoscopic display creates the three-dimensional scene or illusion of depth using a flat screen or imaging device and does not require the use of special glasses by the viewer to view the depth. Some autostereoscopic displays utilize the layering of multiple flat liquid crystal displays (LCDs) to provide the different images for each eye.

Layering image forming devices such as LCDs is known to create an interference pattern of bright and dark bands (commonly referred to as moiré interference fringes) across the viewable area of the display. This problem has been addressed in the prior art by placing a holographic diffuser in front of and spaced apart from the layered image forming devices. The space between the holographic diffuser and the layered image forming device has conventionally been provided by an air gap. Such an approach presents challenges when the display is used in harsh environments such as military and defense applications.

The nature of holographic diffusers with their delicate surface topology prevents the diffusion surface from being coupled to the display stack. In addition, the presence of an air gap in between the holographic diffuser and the layered display allows for foreign particles or water condensation to appear between the display surface and the diffusing surface. Damage to the display assembly may also occur in an air gap construction due to the independent vibration displacement of the uncoupled substrates. This may result in degraded image quality for the viewer along with potential damage to the diffusion surface during use in rugged environments.

What is needed is a new display for three dimensional imaging that provides reduced interference patterns while maintaining, for example, legibility and spatial resolution of images on the display.

SUMMARY

One embodiment of the disclosure relates to a display for presenting a stereoscopic image. The display includes multiple layers of image forming devices configured to provide the stereoscopic image and an etched substrate configured to diffuse light projected through or from the multiple layers of image forming devices. The etched substrate is laminated or bonded to a front surface of the multiple layers of image forming devices.

Another embodiment of the disclosure relates to a method for forming a display for presenting a stereoscopic image. The method includes forming multiple layers of image forming devices configured to provide the stereoscopic image and dry film laminating an etched substrate to a front surface of the multiple layers of image forming devices.

Another embodiment of the disclosure relates to a method for forming a display for presenting a stereoscopic image. The method includes forming multiple layers of image forming devices configured to provide the stereoscopic image and liquid bonding an etched substrate to a front surface of the multiple layers of image forming devices.

Another embodiment of the disclosure relates to a system for improving an autostereoscopic display having multiple layers of image forming devices. The system includes an etched diffuser having etching features configured to reduce the number of interference patterns in an autosteroscopic image provided by the multiple layers of image forming devices and a dry film laminate configured to adhere the etched diffuser directly to a front surface of the multiple layers of image forming devices.

Another embodiment of the disclosure relates to a diffuser for a multilayer display. The diffuser includes a substrate. The substrate includes a front surface for facing a viewer and a rear surface for joining to the multilayer display. The front surface includes light diffusing variances in depth relative to a portion of the front surface not having light diffusing variances. The rear surface joins to the multilayer display using at least one of a dry film laminate and liquid bonding adhesive.

It is to be understood that both the foregoing general description and the following detailed description are exemplary and explanatory only, and are not restrictive of the invention as claimed.

BRIEF DESCRIPTION OF THE FIGURES

These and other features, aspects, and advantages of the present disclosure will become apparent from the following description, appended claims, and the accompanying exemplary embodiments shown in the drawings, which are briefly described below.

DETAILED DESCRIPTION

Referring generally to the Figures, a display is configured to provide perceived three dimensional images to a viewer or viewer. The display includes multiple layers of image forming devices (e.g., LCD assemblies, OLED assemblies, plasma assemblies, etc.) for generating the images. The display also includes an etched glass diffuser that is joined to a front surface (nearest the viewer) of the multiple layers of image forming devices. The etched glass diffuser may be joined to the image forming devices using a dry film laminate or liquid bonding adhesive. The etched glass diffuser includes etching features configured to reduce the interference patterns (e.g., moiré interference patterns) in the images provided by the display. The etched glass diffuser reduces interference, but does not substantially reduce image quality. The dry film laminate or liquid bonding adhesive reduces reflectance contributions from air gaps that are present in conventional displays.

Figure 1:
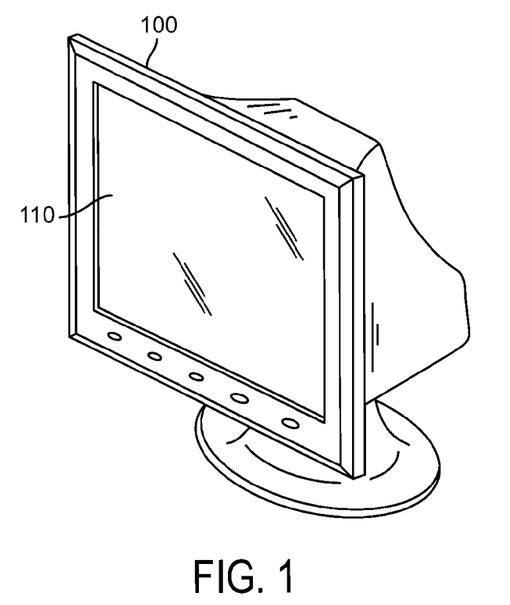
FIG. 1 is a perspective view schematic drawing of a display according to an exemplary embodiment.

Referring to FIG. 1, a display 100 (e.g., an electronic display) is shown that provides graphical and/or textual output to a viewer. While display 100 is illustrated as a stand alone monitor, according to various other exemplary embodiments display 100 may be integrated or mounted in various locations such as in a vehicle (e.g., aircraft, automobile, marine vehicle, space vehicle, or any other type of vehicle).

Display 100 is shown to include a screen. The screen may be made of a glass substrate 110, for example alkali alumina silicate glass including sodium or without sodium, soda-lime glass, soda-lime-silica glass, alkali-silicate glass, or any other type of glass, according to various exemplary embodiments. According to some exemplary embodiments "Gorilla" glass, Corning model 1317 glass, or Corning model 2317 glass, each available from Corning Incorporated of Corning, N.Y., may be used.

Display 100 can also be a military display, part of a head-up display (HUD), a liquid crystal display (LCD), an organic light emitting diode (OLED) display, an industrial display, a control panel (e.g., HVAC control, equipment control, etc.) display, a portable device (e.g., portable media player, PDA, cellular phone, etc.) display, etc. According to some exemplary embodiments, display 100 may include a touch screen feature capable of receiving user input, for example a resistive, capacitive, inductive, or optical (e.g., infrared) touch screen.

According to various exemplary embodiments, glass substrate 110 may be flexible, for example to facilitate touch screen input or a curved display surface. Glass substrate 110 may be textured or etched using a process or method as described below to reduce visibility of interference patterns while maintaining image clarity. A textured surface ideally should not introduce anomalies or defects into glass substrate 110, for example causing delaminating of display 100, process flow patterns, moiré patterns in energized display 100, scintillation of energized display 100, etc. Glass substrate 110 may also be chemically strengthened according to any past, present, or future technology.

According to various exemplary embodiments, display 100 is configured to generate a three-dimensional scene or the illusion of depth by presenting a different image to each eye. According to some exemplary embodiments, display 100 may be a stereoscopic display for providing the three dimensional scene, for example, a polarization display (e.g., linear or circularly polarized), a dichroic filter display presenting anaglyph images, a head mounted display, or a display or window presenting an optically separated direct view of the scene. Polarization and dichroic filter displays may be used with glasses for viewing the three dimensional scene.

According to other exemplary embodiments, display 100 may be an autostereoscopic display for providing the three dimensional scene, such as a spatially interlaced display that does not require glasses for viewing the three dimensional image. The autostereoscopic display may optionally include a switch for providing a two dimensional image or a three dimensional image. In various exemplary embodiments, display 100 may be a parallax barrier display, a lenticular display, or other type of autosteroscopic display (e.g., a rear barrier display, a liquid crystal lenslet display, etc.). Such autostereoscopic displays may present two views, one for each eye, and may also include a head tracking option for adjusting the image based on the position of the head and eyes. Alternatively, the autostereoscopic display may present multiple views for each eye, for example multiple discrete views for each eye or a continuous view for each eye that acts as multiple views for each eye. Some autostereoscopic displays utilize the layering of multiple flat liquid crystal displays (LCDs) to provide different images for each eye.

According to other exemplary embodiments, display 100 may be a time sequential three dimensional display using either active or passive glasses (e.g., polarized or non-polarized glasses). Such displays include polarization (e.g., linear or circular) time sequential displays and spectral filter (e.g., narrowband or broadband) displays. A time sequential display may also be an autosteroscopic display that temporarily interlaces images and does not require use of specialized glasses.

According to still other exemplary embodiments, display 100 may be a volumetric three dimensional display, for example, a display having moving light points, a display having a moving or rotating reflective surface, a layered display (e.g., a double display, a display with more than two layers, etc.), or an addressed media projection. According to still other exemplary embodiments, display 100 may be a holographic display.

Some display types, such as autostereoscopic displays, polarization stereoscopic displays, and layered volumetric displays, exhibit moiré interference patterns because multiple grids are overlaid at an angle or because the layers include slightly different mesh sizes. According to various exemplary embodiments, display 100 is configured to reduce moiré interference, as described below in greater detail.

Figure 2:
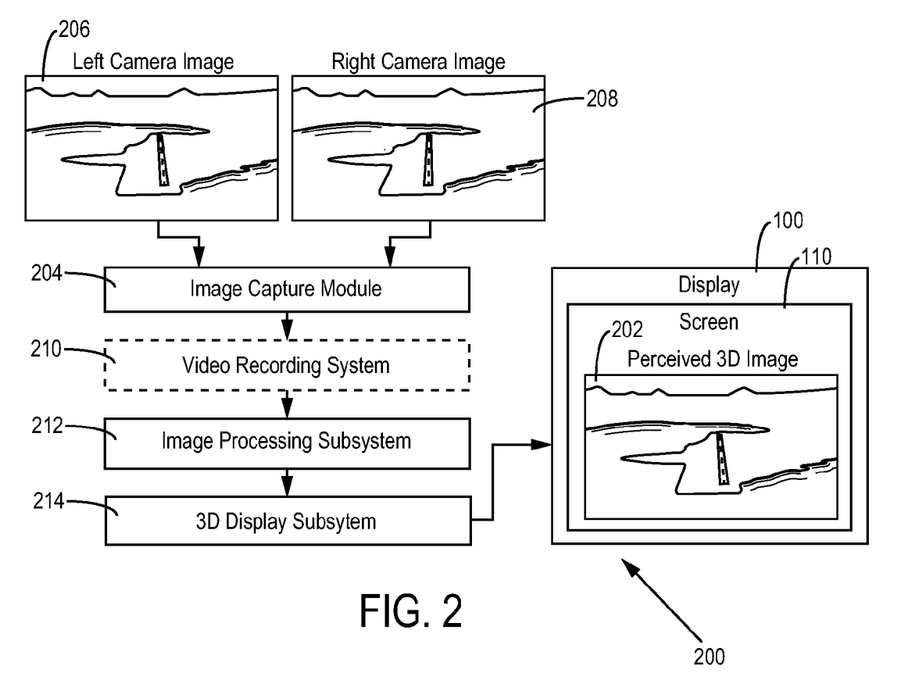
FIG. 2 is a block diagram of a system for capturing and displaying a three dimensional image, according to an exemplary embodiment.

Referring to FIG. 2, a system 200 is configured to provide a perceived three dimensional image 202 to a user or viewer via a display, such as that shown and described with reference to FIG. 1. System 200 includes an image capturing module 204 that is configured to receive an image 206 for presentation to the left eye of the viewer and an image 208 for presentation to the right eye of the viewer. Image capturing module 204 is configured to capture, create, or recreate stereo image pairs (e.g., image 206 and image 208) for display to the viewer. According to some exemplary embodiments, module 204 may be a three dimensional motion picture camera configured to capture video or a series of images or electronics/software configured to generate images, video, or animation. According to some exemplary embodiments, module 204 may create images for generation of a heads-up display, crosshairs, three dimensional lines or grids (e.g., sightlines, airport runway lines, etc.), or other indicators used in military vehicles. Such generated images may be inserted into or on top of captured video, for example to assist in targeting, viewing, piloting, driving, operating, or navigation of a manned or remotely controlled military vehicle.

According to other exemplary embodiments, module 204 may be any other image capturing device or image generating device that outputs stereo image pairs for three dimensional display.

System 200 may also include an optional recording and playback system 210 that records, stores, or plays back video images received from image capturing module 204. For example, recording and playback system 210 may include a hard drive, a digital versatile disc (DVD) writer/player, a blu-ray disc writer/player, a flash memory drive, etc. It is noted that according to other exemplary embodiments, system 210 may be omitted and captured images may be transmitted for processing without being stored.

System 200 further includes an image processing module 212 that is configured to perform image processing or signal processing operations on the captured images received from recording and playback system 210 or image capturing module 204. Image processing module 212 may process the input images (e.g., images 206 and 208) and output images or a set of characteristics or parameters related to the images. For example, image processing module 212 may apply signal processing techniques to the input images for display as a three dimensional image. Image processing module 212 may apply these techniques to the input images for providing appropriate data to each display component of a multi-layered display. According to various exemplary embodiments, image processing module 212 may perform digital image or signal processing operations or may perform analog image or signal processing operations. According to various exemplary embodiments, image processing module 212 may be any hardware configured to execute image processing operations, any hardwired system configured to perform image processing operations, or any image processing software configured to execute on a hardware platform.

In exemplary embodiments where the images are synthetic images, such as images generated by image capturing module 204, image processing module 212 may not operate on the images or may simply format the images for output to the display or to each of multiple layers of the display. Alternatively, in such embodiments, image processing module 212 may be bypassed or may be omitted if only synthetic images are used.

The processed images from image processing module 212 are received by a three dimensional display or three dimensional display subsystem 214 that is configured to provide perceived three dimensional image 202 to the viewer. According to various exemplary embodiments, display subsystem 214 may provide image 202 using any of a variety of stereoscopic or autostereoscopic methods or components. For example, display subsystem 214 may be a multi-layered display subsystem. The multilayered subsystem may have an etched glass diffuser or screen to reduce interference patterns. According to other exemplary embodiments, display subsystem 214 may be any of the displays described above with reference to FIG. 1. Some exemplary embodiments of display subsystem 214 is described in further detail below.

Figure 3:
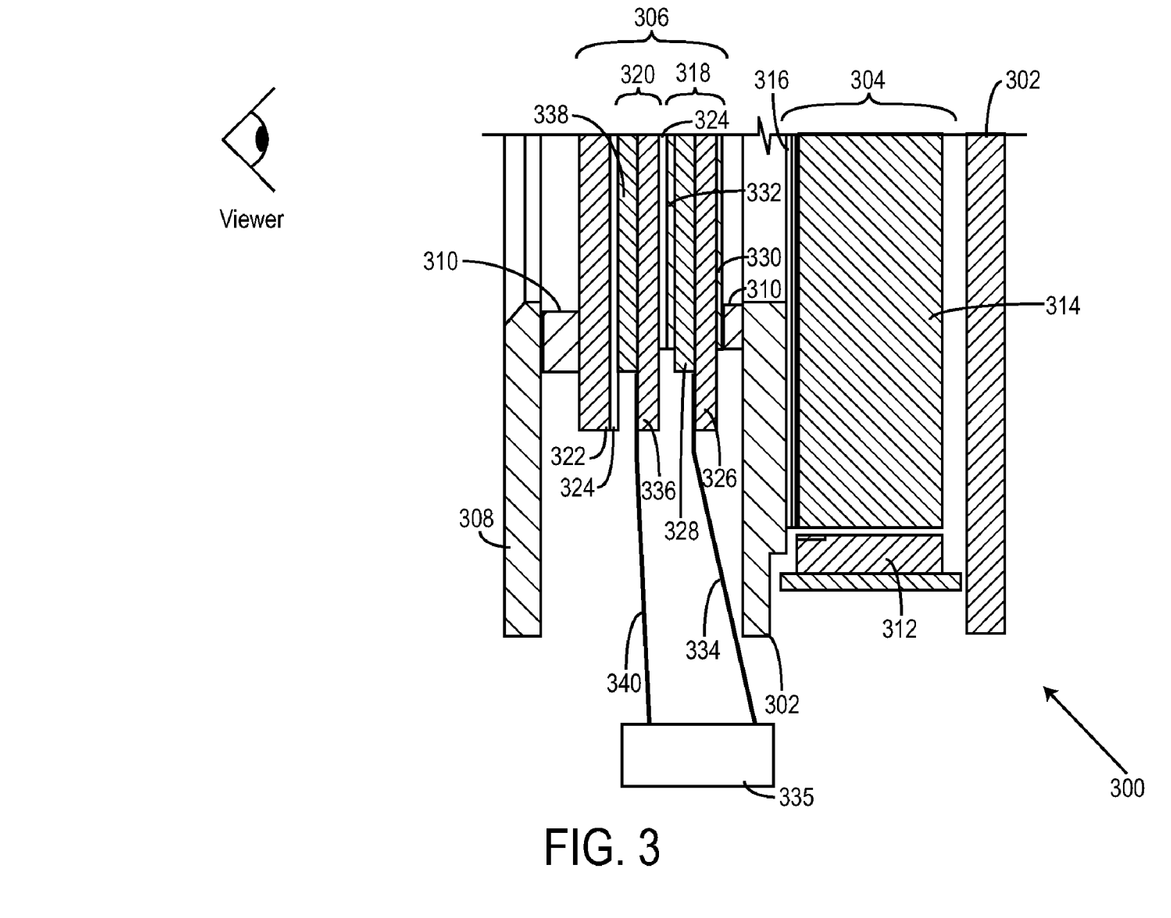
FIG. 3 is a schematic partial cross section of a display subsystem, according to an exemplary embodiment.

Referring to FIG. 3, a partial cross section of a display subsystem 300 (e.g., located in display 100) configured to provide a three dimensional image 202 to a viewer is shown, according to one exemplary embodiment. Subsystem 300 includes a frame 302 (e.g., a housing) that is configured to retain a backlight assembly 304 and a display stack 306. Backlight assembly 304 is a light source configured to provide light to display stack (e.g., an LCD display stack) 306 so that display stack 306 can project visible images for display.

A front side of display stack 306 (the side facing the viewer) is mechanically coupled to a bezel 308 (e.g., metal, plastic, etc.). Bezel 308 is configured to retain display stack 306 with frame 302 and defines an opening that allows the viewer to view the images formed by display stack 306. Display stack 306 is retained by frame 302 and bezel 308 using an adhesive 310, such as silicone (e.g., RTV silicone), caulking, or other sealant. It is noted that FIG. 3 illustrates only a bottom portion of display subsystem 300 and the subsystem extends vertically to a desired height of the display.

Backlight assembly 304 is shown to include a light source 312 (e.g., a light emitting diode (LED), a cold cathode fluorescent lamp (CCFL), an OLED or other emissive device, etc.), a waveguide 314, and a light enhancement film 316. Light source 312 provides light to waveguide 314 for propagation to display stack 306. Light enhancement film 316 is applied to a front side of waveguide 314 that is nearest to display stack 306. Light enhancement film 316 is configured to diffuse and filter the light from waveguide 314 for proper use by display stack 306 in forming images. According to other exemplary embodiments, backlight assembly 304 may include a plurality of LEDs. According to other exemplary embodiments, backlight assembly 304 may include a plurality of light enhancement films.

Display stack 306, for example an LCD display stack, includes a first image forming device 318, a second image forming device 320, an etched glass diffuser 322, and an adhesive 324. First image forming device 318 may be an LCD assembly or other transmissive assembly or an emissive device such as an OLED assembly or a plasma assembly. If an emissive device is used for device 318, backlight 304 may be omitted. Second image forming device 320 may be an LCD assembly or other transmissive assembly. Devices 318 and 320 are layered to provide a stereoscopic or autostereoscopic three dimensional image from the display to a viewer as described above. Device 320 and etched glass diffuser 322 and devices 318 and 320 are bonded together using adhesive 324. According to various exemplary embodiments, adhesive 324 may be an optically transparent dry film or liquid adhesive, as is described below in greater detail.

First image forming device 318 (rear image forming device farthest from the eye) may be configured to affect the intensity or gray scale for each pixel. Device 318 includes a display matrix 326, a color filter 328 (for a color display), a rear polarizer 330, and a front polarizer 332. Display matrix 326 is configured to form or generate the images for viewing. Display matrix 326 is a matrix of pixels that can be illuminated. Display matrix 326 may be a matrix of thin film transistors, another active (powered) matrix, or a passive matrix. Color filter 328 is configured to allow only certain colors and color intensities from display matrix 326 from passing to device 320. Rear polarizer 330 is a film or glass substrate configured to block light of a specific polarity from backlight assembly 304 from passing to display matrix 326, for example, to block horizontally or vertically polarized light. Front polarizer 332 is a film or layer configured to block light of a specific polarity from color filter 328 from passing to device 320, for example, to block vertically to horizontally polarized light. Image forming device 318 is electrically coupled to a power source via an electrical connector 334, for example, for a tape carrier package or other electrical packaging. Electrical connector 334 is also electronically coupled to processing electronics 335 for receiving data input. The data received from processing electronics 335 may determine how much to affect the intensity or gray scale for each pixel.

Second image forming device 320 (front image forming device closest to the eye) may be configured to affect a percentage of light that is provided by each pixel for transmission to each of the left and right eye of the viewer. Device 320 includes a display matrix 336 and a color filter 338 (for a color display). Display matrix 336 receives the polarized light from device 318 and directs a percentage of the image to each eye. Display matrix 336 is a matrix of pixels that can be illuminated. Display matrix 336 may be a matrix of thin film transistors, another active (powered) matrix, or a passive matrix. Color filter 338 is configured to allow only certain colors and color intensities from display matrix 336 from passing to diffuser 322. Image forming device 320 is electrically coupled to a power source via an electrical connector 340, for example, for a tape carrier package or other electrical packaging. Electrical connector 340 is also electronically coupled to processing electronics 335 for receiving data input. The data received from processing electronics 335 may determine how much to affect the percentage of light that is provided by each pixel.

Etched glass diffuser 322 diffuses light from the images formed by image forming devices 318 and 320 so that any moiré interference patterns produced are at least partially filtered out. The filtering of diffuser 322 may not noticeably reduce the clarity of the images. Etched glass diffuser 322 is exposed to the environment through the opening in bezel 308. Diffuser 322 is configured to increase the ruggedness of display subsystem 300. Etched glass diffuser 322 may advantageously have a birefringence that is lower than a diffuser made from a plastic material with a high birefringence. Diffuser 322 may protect devices 318 and 320 from the environment. For example, diffuser 322 may prevent or reduce moisture contact with devices 318 and 320. Diffuser 322 may prevent or reduce temperature changes of devices 318 and 320. Diffuser 322 may prevent or reduce impact of objects, debris, or dust with devices 318 and 320.

The thickness of glass diffuser 322 may differ based on a number of variables. For example, the thickness may differ based on the strength desired for the application, the size of the package that houses or retains the glass, the depth of etching desired, etc. In some exemplary embodiments, the thickness may be greater than about 1 mm in thickness, less than about 1 mm in thickness, less than about 0.7 mm in thickness, less than about 0.5 mm in thickness, less than about 0.1 mm in thickness, between about 0.5 mm and 1 mm in thickness, between about 0.05 mm and 1 mm in thickness, between about 0.3 mm and 0.7 mm in thickness, or between about 0.05 mm and 0.7 mm in thickness. In other exemplary embodiments, glass diffuser 322 may be within any of these thickness ranges or other ranges. Glass diffuser 322 may be controllably textured using the processes and methods described below.

Figure 4:
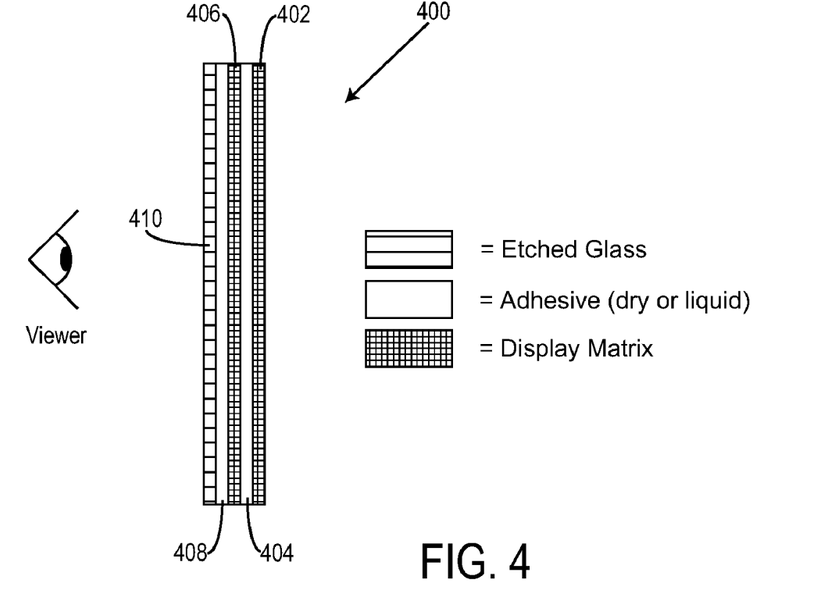
FIG. 4 is a schematic cross section of a display stack, according to an exemplary embodiment.

Referring to FIG. 4, a display stack 400 for presenting a three dimensional image to a viewer is illustrated, according to an exemplary embodiment. Display stack 400 may be similar to display stack 306 in FIG. 3. Display stack 400 is shown as a multi-layer matrix display or an autosteroscopic display (e.g., a lenticular or parallax barrier display). Display stack 400 includes a first image forming device 402 (e.g., an LCD assembly, an OLED assembly, a plasma assembly, etc.) including a display matrix (e.g., display matrix 326), a first adhesive layer 404, a second image forming device 406 (e.g., an LCD assembly) including a display matrix (e.g., display matrix 336), a second adhesive layer 408, and an etched glass substrate or diffuser 410.

According to various exemplary embodiments, first adhesive 404 and/or second adhesive 408 may be any dry film laminate or liquid bonding adhesive. For example, first adhesive 404 and/or second adhesive 408 may be a dry laminate adhesive disclosed in U.S. Ser. No. 12/009,375, filed Jan. 18, 2008, U.S. Ser. No. 12/009,482, filed Jan. 18, 2008, U.S. Ser. No. 12/009,472, filed Jan. 18, 2009, U.S. Ser. No. 12/009,393, filed Jan. 18, 2008, U.S. Ser. No. 12/009,373, filed Jan. 18, 2008, U.S. Ser. No. 12/009,372, filed Jan. 18, 2008, U.S. Pat. No. 5,592,288, filed Apr. 28, 1995, U.S. Pat. No. 7,566,254, filed Aug. 30, 2005, or P.C.T. Application No. PCT/US2009/031151, filed Jan. 15, 2009, each of which is herein incorporated by reference in its entirety, or any other dry laminate. First adhesive 404 and second adhesive 408 may also be a liquid adhesive disclosed in U.S. Pat. No. 5,867,241, filed Apr. 28, 1995, U.S. Pat. No. 6,388,724, filed May 2, 2000, or U.S. Pat. No. 7,452,258, filed Aug. 30, 2005, each of which is herein incorporated by reference, or any other liquid adhesive.

According to various exemplary embodiments, first adhesive 404 and/or second adhesive 408 may be applied using any dry film laminate or liquid bonding process or method. For example, etched glass substrate or diffuser 410 may be joined to a front surface of second image forming device 406 of the multiple layers of image forming devices using a method including disposing a pressure-sensitive adhesive layer between a surface of etched glass substrate 410 and the front surface of second device 406, disposing etched glass substrate 410, pressure-sensitive adhesive layer, and device 406 within a vacuum chamber, evacuating the vacuum chamber, and applying pressure to at least one of etched glass substrate 410 and device 406. First adhesive 404 and/or second adhesive 408 may be applied using one of the dry laminate processes or methods disclosed in U.S. Ser. No. 12/009,375, filed Jan. 18, 2008, U.S. Ser. No. 12/009,482, filed Jan. 18, 2008, U.S. Ser. No. 12/009,472, filed Jan. 18, 2009, U.S. Ser. No. 12/009,393, filed Jan. 18, 2008, U.S. Ser. No. 12/009,373, filed Jan. 18, 2008, U.S. Ser. No. 12/009,372, filed Jan. 18, 2008, U.S. Pat. No. 5,592,288, filed Apr. 28, 1995, U.S. Pat. No. 7,566,254, filed Aug. 30, 2005, or P.C.T. Application No. PCT/US2009/031151, filed Jan. 15, 2009, each of which is herein incorporated by reference in its entirety, or any other dry laminate process or method. First adhesive 404 and second adhesive 408 may also be applied using a liquid adhesive process or method disclosed in U.S. Pat. No. 5,867,241, filed Apr. 28, 1995, U.S. Pat. No. 6,388,724, filed May 2, 2000, or U.S. Pat. No. 7,452,258, filed Aug. 30, 2005, each of which is herein incorporated by reference, or any other liquid adhesive process or method.

According to various exemplary embodiments, the glass of etched glass diffuser 410 may be any glass suitable for use on a display. For example, the glass may be alkali alumina silicate glass including sodium or without sodium, soda-lime glass, soda-lime-silica glass, alkali-silicate glass, or any other type of glass that can be etched. The glass may be one of the glass substrates disclosed in U.S. Ser. No. 12/611,016, filed Nov. 2, 2009, or disclosed in U.S. Ser. No. 12/485,744, filed Jun. 16, 2009, each of which is herein incorporated by reference in its entirety.

According to various exemplary embodiments, the glass of etched glass diffuser 410 may be etched using any glass etching process. For example, the glass may be etched or textured using an acid or caustic solution. Such acids or caustic solutions may include at least one of sodium hydroxide, hydrochloric acid, and hydrofluoric acid. Etched glass diffuser may be formed using a method including cleaning the glass substrate with at least one surfactant and etching the glass substrate using a caustic solution. The percentage of caustic solution provided may be controlled using fluid flow and temperature to control the depth of the etching. The method may also include acid cleaning the etched glass substrate to remove glass residuals and surfactants. The method may also include chemically strengthening the etched and cleaned substrate. The glass may be a etched using one or more of the processes or methods disclosed in U.S. Ser. No. 12/611,016, filed Nov. 2, 2009, or disclosed in U.S. Ser. No. 12/485,744, filed Jun. 16, 2009, each of which is herein incorporated by reference in its entirety.

Etched glass diffuser 410 includes etching features configured to minimize or reduce the appearance of moiré interference fringes created by layering of image forming devices 402 and 406. Etched glass diffuser 410 may maintain legibility and spatial resolution of images on the display (reduce "fuzzy" appearance of the display due to the presence of a diffuser in front of the layered displays) while still reducing the visibility of moiré interference fringes. A front surface of diffuser 410 includes light diffusing variances in depth relative to a portion of the front surface not having light diffusing variances. A rear surface of diffuser 410 is generally also etched and includes spaces or light diffusing variances in depth relative to a portion of the rear surface not having light diffusing variances. According to other exemplary embodiments, the rear surface may be smooth relative to the front surface. The rear surface is configured for joining to image forming device 406 using at least one of a dry film laminate and liquid bonding adhesive. The dry film laminate or liquid bonding adhesive (e.g., an optically clear adhesive) may fill in at least a portion of the spaces or light diffusing variances in the rear surface. Therefore, once diffuser 410 is joined with device 406, the rear surface of diffuser 410 does not diffuse light or has reduced diffusion, while the front surface diffuses light.

Etched glass diffuser 410 may have a low optical birefringence (small retardation of light) relative to diffuser made of a plastic material having a high birefringence. Etched glass diffuser 410 may avoid disturbance of the polarized light exiting the layered display and/or entering the glasses of the viewer (in a stereoscopic application). Diffuser 410 is also configured to reduce ambient reflections from sunlight and other bright sources. For example, diffuser 410 may reduce ambient reflections because of the etching or because of an anti-glare coating. The material properties of etched glass diffuser 410 may be closely matched to the glass properties of devices 402 and 406 to reduce distortions during thermal transitions.

Display stack 400 may provide improved contrast to the overall display assembly by directly laminating or bonding etched glass diffuser substrate 410 to the surface of second image forming device 406. The direct laminating or bonding may significantly reduce refractive index mismatches at the front diffuser/air and rear air/image forming device interfaces. Physically bonding diffuser 410 to devices 406 and 402 into a single laminate increases resonant frequency and allows diffuser 410 and devices 406 and 402 to act as one piece while under vibration from external inputs. Diffuser 410 is intended to negate or reduce the possibility of foreign material entering the display or the formation of visible water condensate between diffuser 410 and device 406 once interlayer adhesive 408 has joined the substrates together. Adhesive 408 reduces reflectance contributions from air gaps that are present in conventional displays.

According to various exemplary embodiments, an antireflective coatings may be applied to the surface of etched glass 410 to further reduce specular reflectance of the diffuser surface and improve contrast and sunlight readability of the display.

Figure 5:
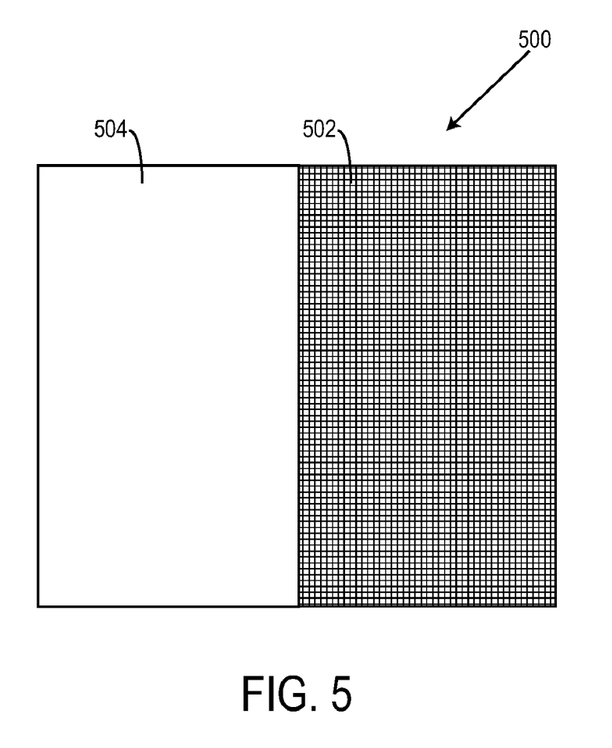
FIG. 5 is a schematic illustration of a display having display portions showing both an interference pattern and a filtered interference pattern, according to an exemplary embodiment.

Referring to FIG. 5, a schematic illustration of a display 500 shows a display portion 502 exhibiting an interference pattern and a display portion 504 exhibiting a filtered interference pattern. The interference pattern of display portion 502 (e.g., a moiré interference pattern) may be similar to the result of a multi-layered display that does not include an optical diffuser. Display portion 504 illustrates a filtered interference pattern that may be similar to the results of a multi-layered display that includes a diffuser that is mechanically bonded to the display layers.

Figure 6:
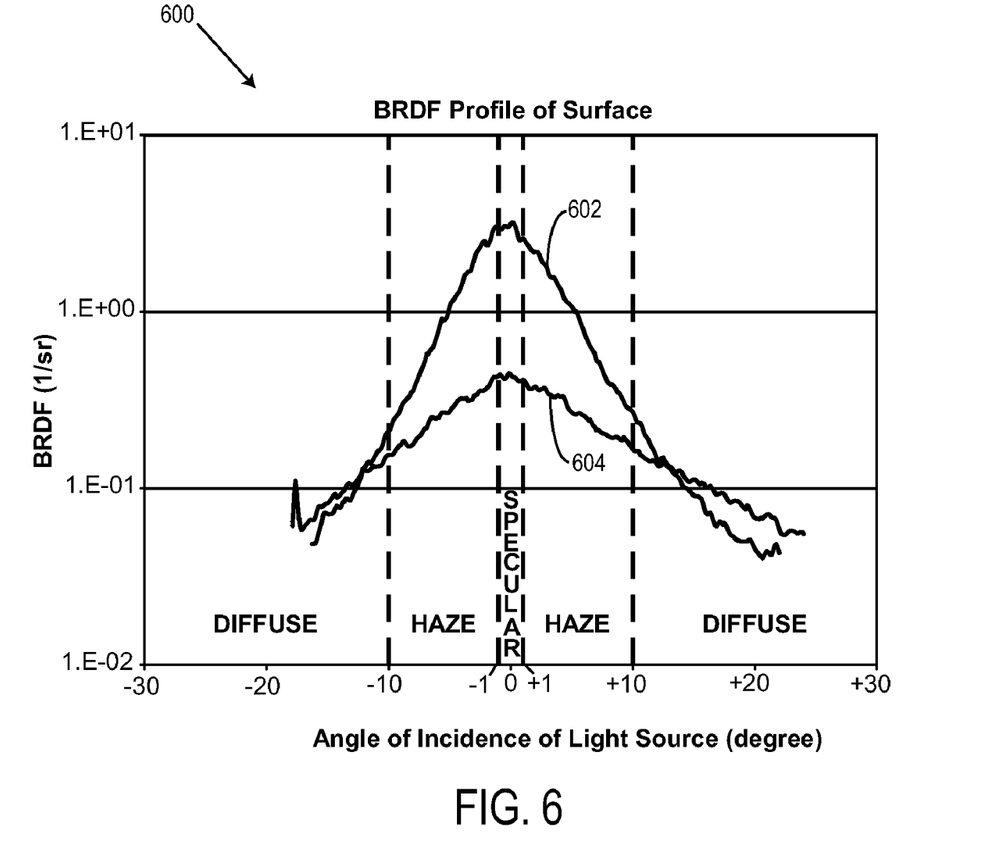
FIGS. 6 and 7 are illustrations representing profile views of bidirectional reflectance distribution functions for etched glass substrates, according to various exemplary embodiments.
Figure 7:
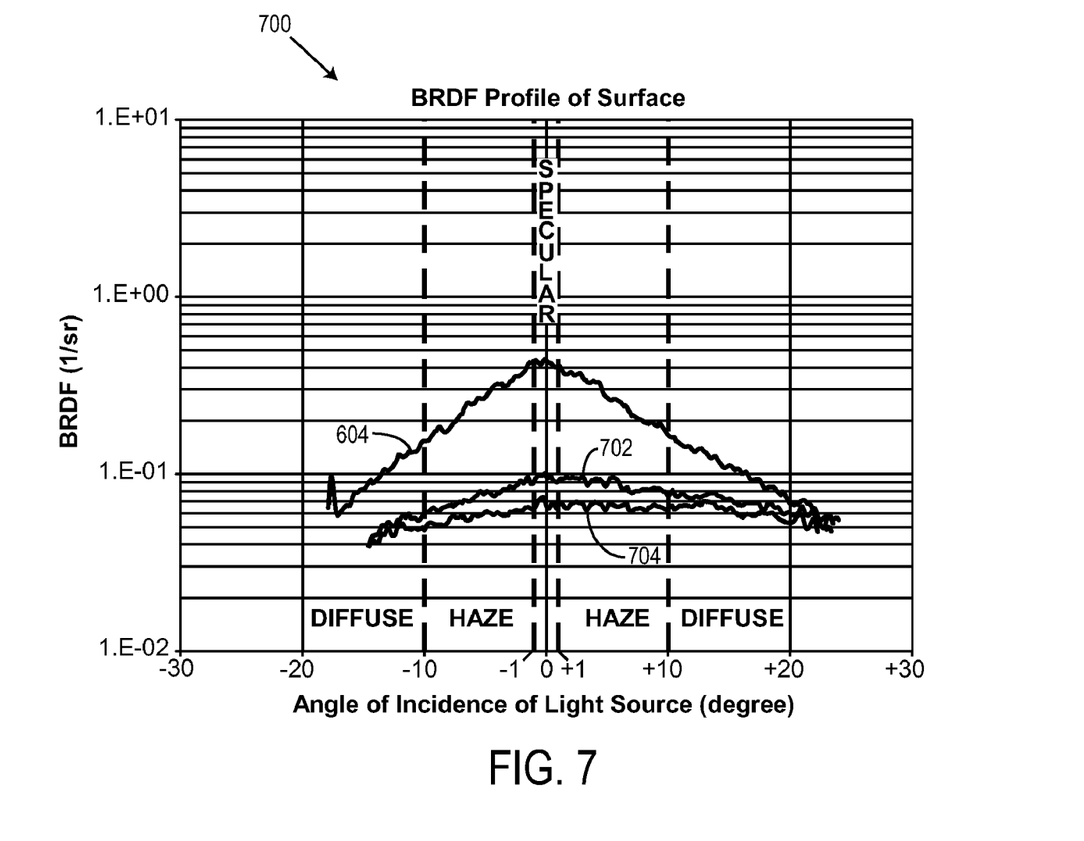

Referring to FIGS. 6-7, graphs representing varying reflected light distributions of an etched glass diffuser (e.g., a randomly etched glass substrate) are shown, according to various exemplary embodiments. The varying graphs illustrate the distribution of reflected light energy in a single plane normal to the surface of the substrate or diffuser from a single light source at a given incident angle to the surface. This distribution of reflected light is commonly referred to as the bidirectional reflectance distribution function (BRDF), which defines how light reflects at a surface. The graphs depict the ratio of reflected light energy (at an angle normal from the surface) relative to the total light energy incident upon the surface by a single light source (e.g., a laser beam) in terms of steradians$^{-1}$. The graphs shown in FIGS. 6-7, are measured using a ScatterScope 003, BRDF Monitor System designed and manufactured by ScatterMaster, LLC in Tucson, Ariz.

The BRDF profile may be further characterized by dividing the reflectance profile into the three types of reflected light: specular, haze and diffuse. The region of specular reflectance is defined to be between about −1 to +1 degrees angle of incidence from the light source. The region of haze reflectance is defined to be within about −1 to −10 and about +1 to +10 degrees angle of incidence from the light source. The region of diffuse (lambertian) reflectance is defined to be less than about −10 and greater than about +10 degrees angle of incidence from the light source.

Referring specifically to FIG. 6, a graph 600 illustrates reflected light distributions of surfaces for two etched glass diffusers, according to some exemplary embodiments. Graph 600 shows two reflectance profiles of the two etched glass surfaces. A profile 602 corresponding to a first surface is shown to exhibit a higher degree of specular and haze reflectance than a profile 604 corresponding to a second surface. Profile 604 of the second surface is shown to provide a higher degree of diffuse reflectance than the profile 602 of the first surface. The reflectance attributes of profile 604 for the second surface may be more desirable than the reflectance attributes of profile 602 for the first surface, according to various exemplary embodiments. Profile 604 may be more desirable because of the lower specular and haze reflectance.

Referring specifically to FIG. 7, a graph 700 illustrates reflected light distributions of surfaces for multiple etched glass diffusers, according to some exemplary embodiments. Graph 700 shows three BRDF profiles for the three surfaces, profile 604 for the second surface (as described with reference to FIG. 6), a profile 702 for a third surface, and a profile 704 for a fourth surface. Profile 604 for the second surface is provided for reference purposes and demonstrates the reflectance profile of a glass substrate that may have insufficient diffuse properties to be used in various exemplary embodiments described herein. Profile 702 for the third surface and profile 704 for the fourth surface illustrate more preferable reflectance attributes with lower diffuse, haze, and specular reflectance for various exemplary embodiments of this disclosure. For example, the third or fourth surface may be optically coupled to the front of a multi-layer display stack including two matrixed liquid crystal display devices (e.g., with a pixel pitch of about 0.191 millimeters by 0.191 millimeters).

Profiles 702 and 704 for the third and fourth surfaces may be quantified by integrating the area under each region of the corresponding curve for the desired surface. The results of this integration establishes a range of values that when described in conjunction with profiles 702 and 704 of the third and fourth surfaces characterize the desired surface reflectance features for use in various exemplary embodiments. According to some exemplary embodiments, an etched glass surface is desired that exhibits a BRDF profile similar to profiles 702 and 704 for the third and fourth surfaces. According to various exemplary embodiments, the etched diffuser may have BRDF integrated values between about 0.1 to 0.2 in the specular region (defined above), between about 1.0 to 1.5 in the haze region (defined above), and between about 0.9 to 1.4 in the diffuse region (defined above). An etched glass surface with these reflectance attributes may balance the visual discrimination of interference patterns with image display quality. According to other exemplary embodiments, the etched diffuser may exhibit fewer than all of the BRDF integrated values described above. The etched diffuser may only have the BDRF integrated value for the specular region, the haze region, or the diffuse region. Alternatively, the etched diffuser may only have the BDRF integrated values for any two of the specular, haze, and diffuse regions.

Figure 8:
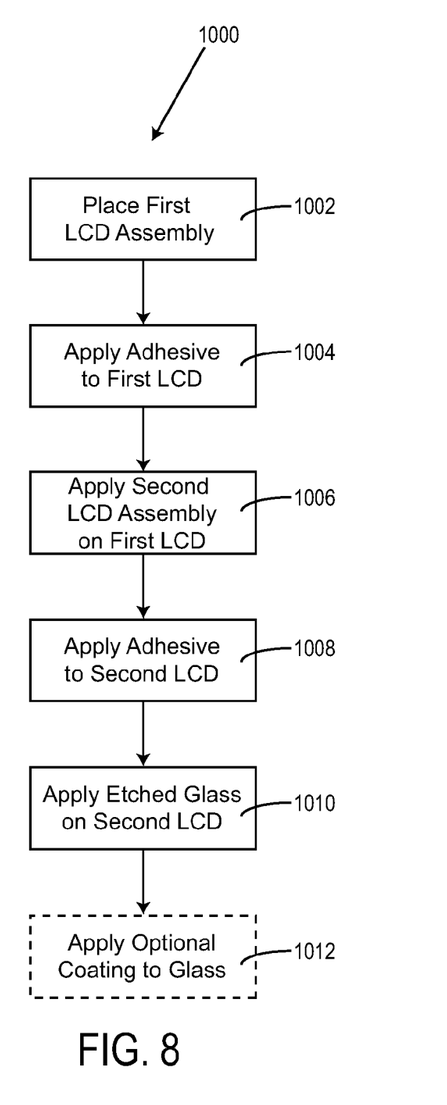
FIG. 8 is a flow chart illustrating a method for assembling a display stack, according to an exemplary embodiment.

Referring to FIG. 8, a flowchart illustrates a method 1000 for assembling a display stack (e.g., display stack 400), according to an exemplary embodiment. At a step 1002, a first LCD assembly (e.g., image forming device 318 or 402) is placed to begin the display stack. At a step 1004, a first adhesive layer (e.g., adhesive layer 324 or 404), for example an optically clear dry film laminate or liquid adhesive, is applied on a surface of the first LCD assembly. At a step 1006, a second LCD assembly (e.g., image forming device 320 or 406) is placed on the first adhesive layer and to bond the second LCD assembly to the first LCD assembly. The second LCD assembly may be positioned relative to the first LCD assembly such that the pixels of each LCD assembly are aligned. For example, the LCD assemblies may be aligned using an optical alignment method having one or more stages. At a step 1008, a second adhesive layer (e.g., adhesive layer 324 or 408), for example an optically clear dry film laminate or liquid adhesive, is applied on a surface of the second LCD assembly. Alternatively, the dry film laminate or liquid adhesive may be applied on a surface of an etched glass diffuser. At a step 1010, an etched glass diffuser is placed on the second adhesive to bond with the second LCD assembly. Alternatively, if the second adhesive is applied to the diffuser, the surface of the diffuser having the second adhesive is placed on the second LCD assembly. An edge of the etched glass diffuser may be aligned with an edge of the second LCD assembly to complete the display stack. At a step 1012, an optional coating (e.g., an anti-reflective coating to increase readability of the display in sunlight) may be applied to the exposed surface (the non-bonded surface) of the etched glass diffuser. In other embodiments, the coating may applied prior to adhering to the second LCD assembly. It is noted that while the illustrated exemplary embodiment described assembly of an LCD display stack, according to other exemplary embodiments, the display stack may include any type of image forming device.

Figure 9:
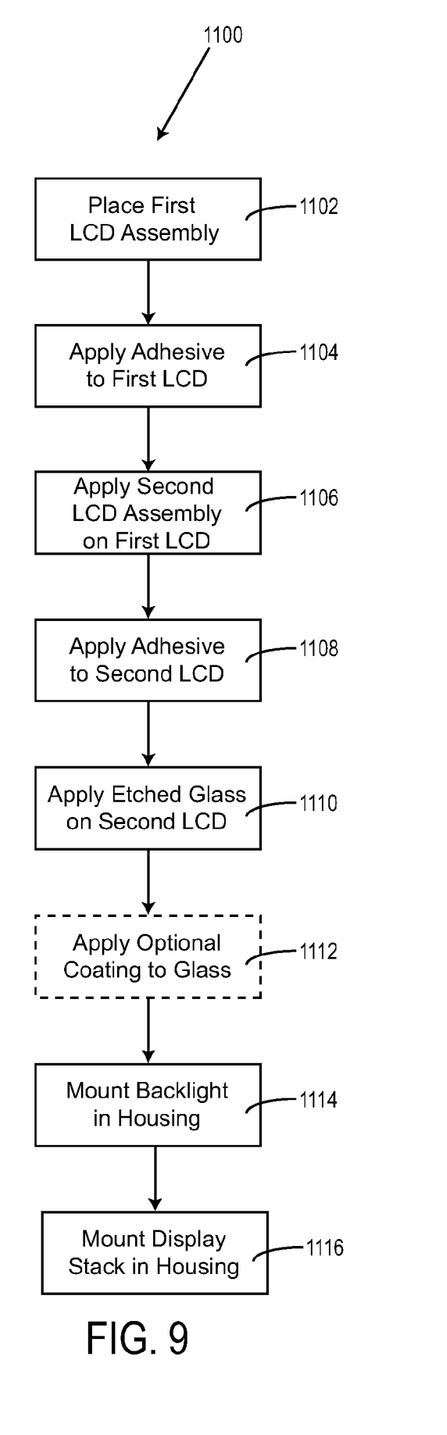
FIG. 9 is a flowchart illustrating a method for assembling a display subsystem, according to an exemplary embodiment.

Referring to FIG. 9, a flowchart illustrates a method 1100 for assembling a display subsystem (e.g., display subsystem 300), according to an exemplary embodiment. At a step 1102, a first LCD assembly (e.g., image forming device 318 or 402) is placed to begin the display stack. At a step 1104, a first adhesive layer (e.g., adhesive layer 324 or 404), for example an optically clear dry film laminate or liquid adhesive, is applied on a surface of the first LCD assembly. At a step 1106, a second LCD assembly (e.g., image forming device 320 or 406) is placed on the first adhesive layer and to bond the first and second LCD layers together. The second LCD assembly may be positioned relative to the first LCD assembly such that the pixels of each LCD assembly are aligned. At a step 1108, a second adhesive layer (e.g., adhesive layer 324 or 408), for example an optically clear dry film laminate or liquid adhesive, is applied on a surface of the second LCD assembly. Alternatively, the dry film laminate or liquid adhesive may be applied on a surface of an etched glass diffuser. At a step 1110, an etched glass diffuser is placed on the second adhesive and to bond with the second LCD assembly. Alternatively, if the second adhesive is applied to the diffuser, the surface of the diffuser having the second adhesive is placed on the second LCD assembly. An edge of the etched glass diffuser may be aligned with an edge of the second LCD assembly to complete the display stack (e.g., display stack 400). At a step 1112, an optional coating (e.g., an anti-glare coating to increase readability of the display in sunlight) may be applied to the exposed surface (the non-bonded surface) of the etched glass diffuser. In other embodiments, the coating may applied prior to adhering to the second LCD assembly.

At a step 1114, a backlight for providing light to the display stack is mounted in a display subsystem housing (e.g., housing or frame 302 of subsystem 300). The backlight may be mounted to the housing an adhesive (e.g., adhesive 310), such as silicone (e.g., RTV silicone), caulking, or another sealant. At a step 1116, the display stack is mounted in the display subsystem housing in front of the backlight. The display stack may be mounted to the housing an adhesive (e.g., adhesive 310), such as silicone (e.g., RTV silicone), caulking, or another sealant. It is noted that while the illustrated exemplary embodiment described assembly of an LCD display stack and LCD subsystem, according to other exemplary embodiments, the display stack may include any type of image forming device.

It is noted that while the foregoing description generally described an etched glass diffuser, according to other exemplary embodiments, an etched plastic material (e.g., an optically clear plastic) may be used that exhibits similar properties to the diffusers described above. For purposes of this disclosure, the phrase "optically clear" means having greater than 90% average transmission of the visible spectrum of light. For purposes of this disclosure, the phrase "low birefringence" means having uniform and a low level of light retardation.

As utilized herein, the terms "approximately," "about," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

Exemplary embodiments illustrated in FIGS. 1 and 2 may include program products comprising computer or machine-readable media for carrying or having machine-executable instructions or data structures stored thereon. For example, image capturing module 204, recording and playback system 210, and/or image processing module 212 may be computer driven. Exemplary embodiments illustrated in the methods of FIGS. 8 and 9 may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present invention could be accomplished with standard programming techniques with rule based logic and other logic to accomplish the various connection steps, processing steps, comparison steps and decision steps.

It is also important to note that the construction and arrangement of the components as shown in the various exemplary embodiments is illustrative only. Although only a few embodiments have been described in detail in this disclosure, those skilled in the art who review this disclosure will readily appreciate that many modifications are possible (e.g., variations in dimensions, structures, shapes and proportions of the various elements, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:

1. A display for presenting a stereoscopic image, comprising:
   multiple layers of image forming devices configured to provide the stereoscopic image;
   an etched substrate configured to diffuse light projected through or from the multiple layers of image forming devices, wherein an integrated bidirectional reflectance distribution function for the etched substrate is between 0.1 and 0.2 at a −1° to 1° angle of incidence of a light source for specular reflectance, is between 1.0 and 1.5 at a −1° to −10° and a 1° to 10° angle of incidence of the light source for haze reflectance, and is between 0.9 and 1.4 at angles less than −10° and greater than 10° angle of incidence of the light source for diffuse reflectance;
   wherein the etched substrate is laminated or bonded to a front surface of the multiple layers of image forming devices.

2. The display of claim 1, wherein at least one of a dry film laminate and liquid bonding adhesive are provided in a volume sufficient to fill spaces between a rear surface of the etched substrate and the multilayer display when both the front and rear surfaces are etched, and wherein the spaces are filled such that the rear surface has reduced light diffusion, wherein an air gap between the front surface and the etched substrate does not exist.

3. The display of claim 1, further comprising an anti-reflective coating applied to the etched substrate.

4. The display of claim 1, wherein the etched substrate comprises at least one of an alkali alumina silicate glass, a soda lime glass, a soda lime silicate glass, and an optically clear plastic with low birefringence.

5. The display of claim 1, wherein the etched glass substrate includes etching features configured to reduce a number of interference patterns in the image.

6. The display of claim 1, wherein the image forming devices comprise at least one of liquid crystal display elements and organic light emitting diode elements.

7. The display of claim 1, wherein the etched glass substrate is laminated to the front surface of the multiple layers of image forming devices using a dry film adhesive.

8. The display of claim 1, wherein the etched glass substrate is bonded to the front surface of the multiple layers of image forming devices using a liquid bonding adhesive.

9. The display of claim 1, wherein the laminate is optically clear.

10. The display of claim 1, wherein the bonding material is optically clear.

11. The display of claim 1, wherein wherein at least one of a dry film laminate and liquid bonding adhesive are provided in a volume sufficient to fill spaces between a rear surface of the etched substrate and the multilayer display when both the front and rear surfaces are etched, and wherein the spaces are filled such that the rear surface has reduced light diffusion.

12. A method for forming a display for presenting a stereoscopic image, comprising:
   forming multiple layers of image forming devices configured to provide the stereoscopic image; and
   dry film laminating an etched substrate to a front surface of the multiple layers of image forming devices using a method comprising:
   disposing a pressure-sensitive adhesive layer between a surface of the etched substrate and the front surface of the multiple layers of image forming devices;
   disposing the etched substrate, pressure-sensitive adhesive layer, and multiple layers of image forming devices within a vacuum chamber;
   evacuating the vacuum chamber; and
   applying pressure to at least one of the etched substrate and the multiple layers of image forming devices.

13. The method of claim 12, further comprising:
   applying an anti-reflective coating to the etched substrate.

14. The method of claim 12, further comprising:
   forming the etched substrate using at least one of an alkali alumina silicate glass, a soda lime glass, a soda lime silicate glass, and an optically clear plastic with low birefringence.

15. The method of claim 12, further comprising:
   forming the etched substrate using a method comprising:
   cleaning a substrate with at least one surfactant;
   etching the substrate using a caustic solution, a percentage of caustic solution being provided by controlling a fluid flow and temperature to control a depth of the etching; and acid cleaning the etched substrate to remove residuals and surfactants.

16. The display of claim 1, wherein the etched substrate is laminated to the front surface of the multiple layers of image forming devices using a method comprising:
disposing a pressure-sensitive adhesive layer between a surface of the etched substrate and the front surface of the multiple layers of image forming devices;
disposing the etched substrate, pressure-sensitive adhesive layer, and multiple layers of image forming devices within a vacuum chamber;
evacuating the vacuum chamber; and
applying pressure to at least one of the etched substrate and the multiple layers of image forming devices.

17. A method for forming a display for presenting a stereoscopic image, comprising:
forming multiple layers of image forming devices configured to provide the stereoscopic image; and
liquid bonding an etched substrate to a front surface of the multiple layers of image forming devices, wherein an integrated bidirectional reflectance distribution function for the etched substrate is between 0.1 and 0.2 at a −1° to 1° angle of incidence of a light source for specular reflectance, is between 1.0 and 1.5 at a −1° to −10° and a 1° to 10° angle of incidence of the light source for haze reflectance, and is between 0.9 and 1.4 at angles less than −10° and greater than 10° angle of incidence of the light source for diffuse reflectance.

18. The method of claim 17, further comprising:
applying an anti-reflective coating to the etched substrate.

19. The method of claim 17, further comprising:
forming the etched substrate using at least one of an alkali alumina silicate glass, a soda lime glass, a soda lime silicate glass, and an optically clear plastic with low birefringence.

20. The method of claim 17, further comprising:
forming the etched substrate using a method comprising:
cleaning a substrate with at least one surfactant;
etching the substrate using a caustic solution, the percentage of caustic solution being provided by controlling a fluid flow and temperature to control the depth of the etching; and
acid cleaning the etched substrate to remove glass residuals and surfactants.

21. A system for improving an autostereoscopic display having multiple layers of image forming devices, the system comprising:
an etched diffuser having etching features configured to reduce a number of interference patterns in an autostereoscopic image provided by the multiple layers of image forming devices; and
a dry film laminate configured to adhere the etched glass diffuser directly to a front surface of the multiple layers of image forming devices, wherein an integrated bidirectional reflectance distribution function for the etched diffuser is between 0.1 and 0.2 at a −1° to 1° angle of incidence of a light source for specular reflectance, is between 1.0 and 1.5 at a −1° to −10° and a 1° to 10° angle of incidence of the light source for haze reflectance, and is between 0.9 and 1.4 at angles less than −10° and greater than 10° angle of incidence of the light source for diffuse reflectance.

22. The system of claim 21, wherein an air gap between the front surface and the etched diffuser does not exist.

23. A diffuser for a multilayer display, comprising:
a substrate, the substrate comprising:
a front surface for facing a viewer; and
a rear surface for joining to the multilayer display,
wherein the front surface comprises light diffusing variances in depth relative to a portion of the front surface not having light diffusing variances, and wherein the rear surface joins to the multilayer display using at least one of a dry film laminate and liquid bonding adhesive, wherein an integrated bidirectional reflectance distribution function for the substrate is between 0.1 and 0.2 at a −1° to 1° angle of incidence of a light source for specular reflectance, is between 1.0 and 1.5 at a −1° to −10° and a 1° to 10° angle of incidence of the light source for haze reflectance, and is between 0.9 and 1.4 at angles less than −10° and greater than 10° angle of incidence of the light source for diffuse reflectance.

24. The diffuser of claim 23, wherein the at least one of a dry film laminate and liquid bonding adhesive are provided in a volume sufficient to fill spaces between the rear surface and the multilayer display when both the front and rear surfaces are etched, and wherein the spaces are filled such that the rear surface has reduced light diffusion.

25. A diffuser for a multilayer display, comprising:
a substrate, the substrate comprising:
a front surface for facing a viewer; and
a rear surface for joining to the multilayer display,
wherein the front surface comprises light diffusing variances in depth relative to a portion of the front surface not having light diffusing variances, and wherein the rear surface joins to the multilayer display using at least one of a dry film laminate and liquid bonding adhesive, wherein the at least one of a dry film laminate and liquid bonding adhesive are provided in a volume sufficient to fill spaces between the rear surface and the multilayer display when both the front and rear surfaces are etched, and wherein the spaces are filled such that the rear surface has reduced light diffusion.

* * * * *